US006778322B2

(12) United States Patent
Kakui et al.

(10) Patent No.: US 6,778,322 B2
(45) Date of Patent: Aug. 17, 2004

(54) FOUR-WAVE MIXING SUPPRESSION IN RAMAN AMPLIFIERS

(75) Inventors: Motoki Kakui, Yokohama (JP); Masaaki Hirano, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 141 days.

(21) Appl. No.: 10/120,581

(22) Filed: Apr. 12, 2002

(65) Prior Publication Data

US 2002/0181077 A1 Dec. 5, 2002

(30) Foreign Application Priority Data

Apr. 24, 2001 (JP) .................................... P2001-126378

(51) Int. Cl.[7] .............................................. H01S 3/00
(52) U.S. Cl. ......................................................... 359/334
(58) Field of Search ........................................ 359/334

(56) References Cited

U.S. PATENT DOCUMENTS

| | | | | |
|---|---|---|---|---|
| 6,205,268 B1 | * | 3/2001 | Chraplyvy et al. | 385/24 |
| 6,239,902 B1 | * | 5/2001 | Islam et al. | 359/334 |
| 6,323,993 B1 | * | 11/2001 | Hansen et al. | 359/337 |
| 6,445,492 B1 | * | 9/2002 | Nielsen et al. | 359/334 |
| 6,483,633 B2 | * | 11/2002 | Onishi et al. | 359/341.31 |
| 6,519,079 B1 | * | 2/2003 | Grochocinski et al. | 359/337 |
| 6,597,495 B2 | * | 7/2003 | Gertsvolf et al. | 359/341.3 |
| 2001/0036347 A1 | * | 11/2001 | Hansen et al. | 385/123 |
| 2002/0145793 A1 | * | 10/2002 | Bock et al. | 359/334 |
| 2002/0181077 A1 | * | 12/2002 | Kakui et al. | 359/334 |
| 2002/0181834 A1 | * | 12/2002 | Eder et al. | 385/15 |
| 2003/0174938 A1 | * | 9/2003 | Headley et al. | 385/27 |

OTHER PUBLICATIONS

"Interwavelength–Band Nonlinear Interactions and Their Suppression in Multiwavelength–Band WDM Transmission Systems", Jun–ichi Kani et al., Journal of Lightwave Technology, vol. 17, No. 11, Nov. 1999, 1999 IEEE, pp. 2249–2260.

* cited by examiner

Primary Examiner—Thomas G. Black
Assistant Examiner—Deandra M. Hughes
(74) Attorney, Agent, or Firm—McDermott Will & Emery LLP (57) ABSTRACT

A Raman amplifier is structured for resistance to signal waveform deterioration and excellent transmission quality. A wavelength spacing is arranged so that non-degenerate type four-wave mixing is effectively suppressed. When the Raman amplification optical waveguide has a positive dispersion slope with respect to the signal light, the zero-dispersion wavelength $\lambda_0$ of the Raman amplification optical waveguide is shorter than the center wavelength $\lambda_{center}$. When the Raman amplification optical waveguide has a negative dispersion slope with respect to the signal light, the zero-dispersion wavelength $\lambda_0$ of the Raman amplification optical waveguide is longer than the center wavelength $\lambda_{center}$.

13 Claims, 4 Drawing Sheets

FOUR-WAVE MIXING SUPPRESSION IN RAMAN AMPLIFIERS

BACKGROUND OF THE INVENTION

1. Field of the Invention

The present invention relates to a Raman amplifier which propagates signal light including a plurality of wavelength components through an optical waveguide and Raman-amplifies the signal light in the optical waveguide; and an optical communication system including the same.

2. Related Background Art

A Raman amplifier utilizing stimulated Raman scattering is an optical device for propagating each of pumping light and signal light through an optical waveguide, e.g., optical fiber, and Raman-amplifying the signal light when the pumping light is supplied thereto, and is employed in optical communication systems and the like. Here, wavelength components included in the pumping light are set to wavelengths shorter than those of the wavelength components included in the signal light by about several tens of nm to about 100 nm.

It has been desired for optical communication systems to suppress the occurrence of nonlinear optical phenomena since signal waveforms deteriorate due to nonlinear effects. In a wavelength division multiplexing (WDM) transmission system which transmits signal light including a plurality of wavelength components, in particular, it is important to suppress the occurrence of four-wave mixing, which is a kind of nonlinear optical phenomena, and the zero-dispersion wavelength of the optical fiber transmission line through which the signal light propagates is set to the outside of the wavelength region of the signal light in order to suppress this phenomenon.

SUMMARY OF THE INVENTION

The inventors studied conventional Raman amplifiers and, as a result, have found the following problem. Namely, even when the zero-dispersion wavelength of the optical waveguide for Raman-amplifying the propagating signal is set to the outside of the wavelength region of the signal light, there are cases where signal waveforms deteriorate due to nonlinear effects in conventional Raman amplifiers (thus lowering their transmission quality).

In order to overcome the problem mentioned above, it is an object of the present invention to provide a Raman amplifier which is hard to deteriorate signal waveforms, so that it realizes an excellent transmission quality, and an optical communication system including the same.

For achieving the above-mentioned object, the Raman amplifier according to the present invention comprises a Raman amplification optical waveguide, and a pumping light supplier. The optical waveguide propagates each of the pumping light including a plurality of wavelength components in a first wavelength band and signal light including a plurality of wavelength components in a second wavelength band, and Raman-amplifies the signal light when the pumping light is supplied thereto. The pumping light supplier supplies the pumping light to the optical waveguide.

In the Raman amplifier according to the present invention, in particular, the optical waveguide has a zero-dispersion wavelength $\lambda_0$ shifted from a center wavelength $\lambda_{center}$ (=$(\lambda_{S,\,rms}+\lambda_{P,\,rms})/2$) existing between a center-of-gravity wavelength $\lambda_{S,\,rms}$ of the signal light and a center-of-gravity wavelength $\lambda_{P,\,rms}$ of the pumping light by such a wavelength spacing that non-degenerate type four-wave mixing is effectively suppressed. The center-of-gravity wavelength $\lambda_{S,\,rms}$ of signal light is given by a weighted mean of respective powers of the plurality of wavelength components included in the signal light, whereas the center-of-gravity wavelength $\lambda_{P,\,rms}$ of the pumping light is given by a weighted mean of respective powers of the plurality of wavelength components included in the pumping light.

The Raman amplifier according to the present invention realizes an excellent transmission quality since the zero-dispersion wavelength $\lambda_0$ of the Raman amplification optical waveguide is shifted from the above-mentioned center wavelength $\lambda_{center}$ by such a wavelength spacing that non-degenerate type four-wave mixing is effectively suppressed. Optical fibers are suitable as the Raman amplification optical waveguide. The Raman amplification efficiency improves with respect to signal light in this case since the optical fibers can be made long with a low loss.

Preferably, in the Raman amplifier according to the present invention, the zero-dispersion wavelength $\lambda_0$ of the Raman amplification optical waveguide is set to a shorter wavelength side than the above-mentioned center wavelength $\lambda_{center}$ when the Raman amplification optical waveguide has a positive dispersion slope with respect to the signal light. Preferably, in the Raman amplifier according to the present invention, the zero-dispersion wavelength $\lambda_0$ of the Raman amplification optical waveguide is set to a longer wavelength side than the above-mentioned center wavelength $\lambda_{center}$ when the Raman amplification optical waveguide has a negative dispersion slope with respect to the signal light. In these cases, the occurrence of non-degenerate type four-wave mixing can be suppressed in view of self-phase modulation and cross-phase modulation as well, whereby an excellent transmission quality is obtained.

Preferably, in the Raman amplifier according to the present invention, the zero-dispersion wavelength $\lambda_0$ of the Raman amplification optical waveguide is set to a longer wavelength side than the above-mentioned center wavelength $\lambda_{center}$ when the optical waveguide has a positive dispersion slope d with respect to the signal light. Preferably, in this case, the Raman amplifier satisfies the following relationship:

$$\lambda_0-\lambda_{center}\geq[48\pi\cdot c\cdot\gamma\cdot P/(\omega^2\cdot d)]^{1/3}$$

where c is the light velocity in vacuum, $\gamma$ is the nonlinear coefficient of the optical waveguide, P is the sum of respective powers of all the wavelength components included in the signal light and all the wavelength components included in the pumping light, and $\omega$ is the optical angular frequency at the center wavelength $\lambda_{center}$.

Preferably, in the Raman amplifier according to the present invention, the zero-dispersion wavelength $\lambda_0$ of the Raman amplification optical waveguide is set to a shorter wavelength side than the above-mentioned center wavelength $\lambda_{center}$ when the optical waveguide has a negative dispersion slope d with respect to the signal light. Preferably, in this case, the Raman amplifier satisfies the following relationship:

$$\lambda_0-\lambda_{center}\leq[48\pi\cdot c\cdot\gamma\cdot P/(\omega^2\cdot d)]^{1/3}$$

In each case, the occurrence of non-degenerate type four-wave mixing can be suppressed in view of self-phase modulation and cross-phase modulation as well, whereby an excellent transmission quality is obtained. Also, the degree of freedom in designing the Raman amplification optical waveguide increases. Preferably, the zero-dispersion wavelength $\lambda_0$ of the Raman amplification optical waveguide is set to a longer wavelength side than all the wavelength components included in the signal light when the optical waveguide has a positive dispersion slope d with respect to the signal light. In this case, the occurrence of normal four-wave mixing is effectively suppressed as well.

The optical communication system according to the present invention comprises an optical fiber transmission line laid in a repeating section, and a Raman amplifier having the structure mentioned above (Raman amplifier according to the present invention). The optical communication system including the Raman amplifier can utilize, as the Raman amplification optical waveguide, an optical fiber transmission line laid in an optical repeating section of the optical communication system. Since the signal light is Raman-amplified by the Raman amplifier having the above-mentioned structure, the optical communication system can effectively suppress the occurrence of nonlinear optical phenomena, thereby yielding an excellent transmission quality.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 5A is a view showing a cross-sectional structure of a Raman amplification optical waveguide, whereas

DETAILED DESCRIPTION OF THE PREFERRED EMBODIMENTS

In the following, embodiments of the Raman amplifier and optical communication system according to the present invention will be explained in detail with reference to FIGS. 1 and 2, 3A and 3B, 4, and 5A and 5B. In the explanation of the drawings, constituents identical to each other will be referred to with numerals identical to each other without repeating their overlapping descriptions.

First Embodiment

Figure 1:
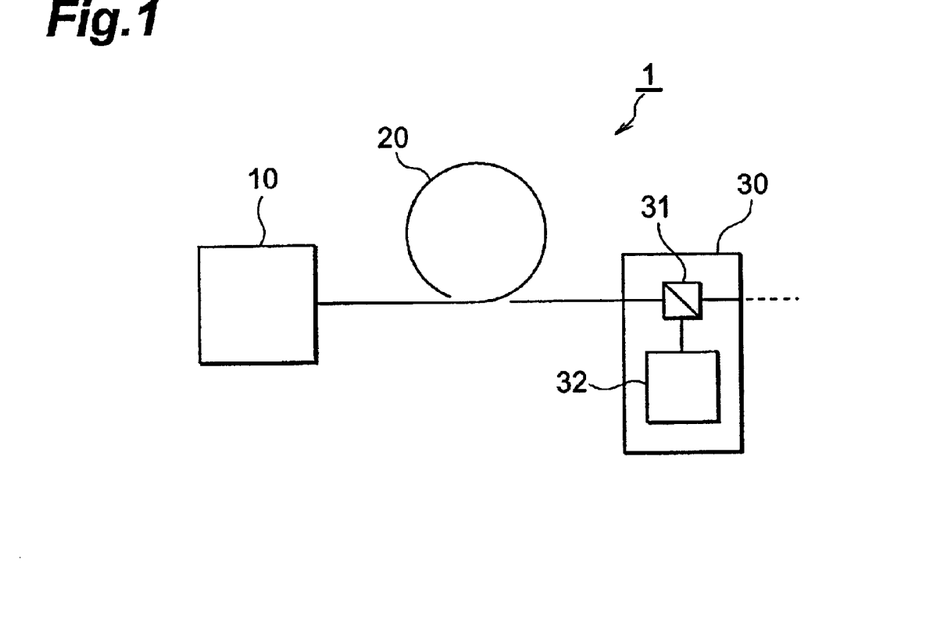
FIG. 1 is a diagram showing the configuration of a first embodiment in the Raman amplifier and optical communication system according to the present invention.

FIG. 1 is a diagram showing the configuration of a first embodiment in the Raman amplifier and optical communication system according to the present invention. The optical communication system 1 according to the first embodiment comprises a repeater (or transmitter) 10, a repeater (or receiver) 30, and an optical fiber transmission line 20 laid in a repeating section between the repeaters 10, 30. Disposed within the repeater 30 are an optical coupler 31 and a pumping light source 32 as a pumping light supplier.

The repeater 10 sends out multiplexed signal light (including a plurality of wavelength components). Toward the repeater 30, the optical fiber transmission line 20 transmits the signal light sent out from the repeater 10. The pumping light source 32 within the repeater 30 includes a plurality of semiconductor laser light sources for outputting respective light components having wavelengths different from each other and a multiplexer for multiplexing the respective light components outputted from the plurality of semiconductor laser light sources, and outputs the light multiplexed by the multiplexer as Raman amplification pumping light. The optical coupler 31 supplies to the optical fiber transmission line 20 the Raman amplification pumping light outputted from the pumping light source 32, and outputs to a later stage the signal light having reached there after propagating through the optical fiber transmission line 20.

In the optical communication system 1 according to the first embodiment, the optical fiber transmission line 20 not only propagates the signal light, but also functions as a Raman amplification optical waveguide (Raman-amplifies the signal light) by propagating the pumping light supplied from the optical coupler 31. Namely, in the optical communication system 1, the Raman amplifier according to the first embodiment is constituted by the optical fiber transmission line 20, the optical coupler 31, and the pumping light source 32.

The optical fiber transmission line 20 in the optical communication system 1 may comprise a structure in which a single-mode optical fiber having a positive chromatic dispersion at a wavelength of 1550 nm and a dispersion-compensating optical-fiber having a negative chromatic dispersion at a wavelength of 1550 nm are fusion-spliced to each other. Preferably, in this case, the dispersion-compensating optical fiber is arranged on the downstream side where the signal light power is attenuated, since it has a high nonlinearity in general. Preferably, the signal light is Raman-amplified in the dispersion-compensating optical fiber.

Second Embodiment

Figure 2:
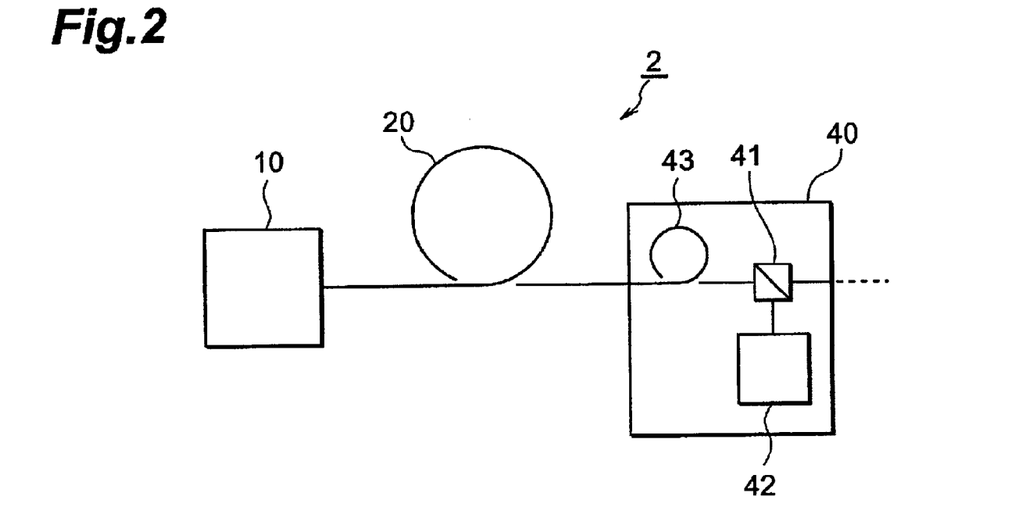
FIG. 2 is a diagram showing the configuration of a second embodiment in the Raman amplifier and optical communication system according to the present invention.

FIG. 2 is a diagram showing the configuration of a second embodiment in the Raman amplifier and optical communication system according to the present invention. The optical communication system 2 according to the second embodiment comprises a repeater (or transmitter) 10, a repeater (or receiver) 40, and an optical fiber transmission line 20 laid in a repeating section between the repeaters 10, 40. Disposed within the repeater 40 are an optical coupler 41, a pumping light source 42 as a pumping light supplier, and a Raman amplification optical fiber 43.

The repeater 10 sends out multiplexed signal light (including a plurality of wavelength components). The optical fiber transmission line 20 transmits the multiplexed signal light from the repeater 10 toward the repeater 40. The pumping light source 42 within the repeater 40 includes a plurality of semiconductor laser light sources for outputting respective light components having wavelengths different from each other and a multiplexer for multiplexing the respective light components outputted from the plurality of semiconductor laser light sources, and outputs the light multiplexed by the multiplexer as Raman amplification pumping light. The optical coupler 41 supplies to the Raman amplification optical fiber 43 the Raman amplification pumping light (including a plurality of wavelength components) outputted from the pumping light source 42, and outputs to a later stage the signal light having propagated through the Raman amplification optical fiber 43.

The Raman amplification optical fiber 43 is optically connected to the optical fiber transmission line 20, and not only propagates the signal light (thereby constituting a part of the optical fiber transmission line), but also Raman-amplifies the signal light by propagating the pumping light supplied from the optical coupler 41. Namely, in the optical communication system 2, the Raman amplifier according to the second embodiment is constituted by the Raman amplification optical fiber 43, the optical coupler 41, and the pumping light source 42.

Preferably, the optical fiber transmission line 20 in the optical communication system 2 is a single-mode optical fiber having a positive chromatic dispersion at a wavelength of 1550 nm, whereas the Raman amplification optical fiber 43 is a dispersion-compensating optical fiber having a negative chromatic dispersion at a wavelength of 1550 nm. In this case, the Raman amplification optical fiber 43 can compensate for the chromatic dispersion of the optical fiber transmission line 20 as well.

Figure 3A:
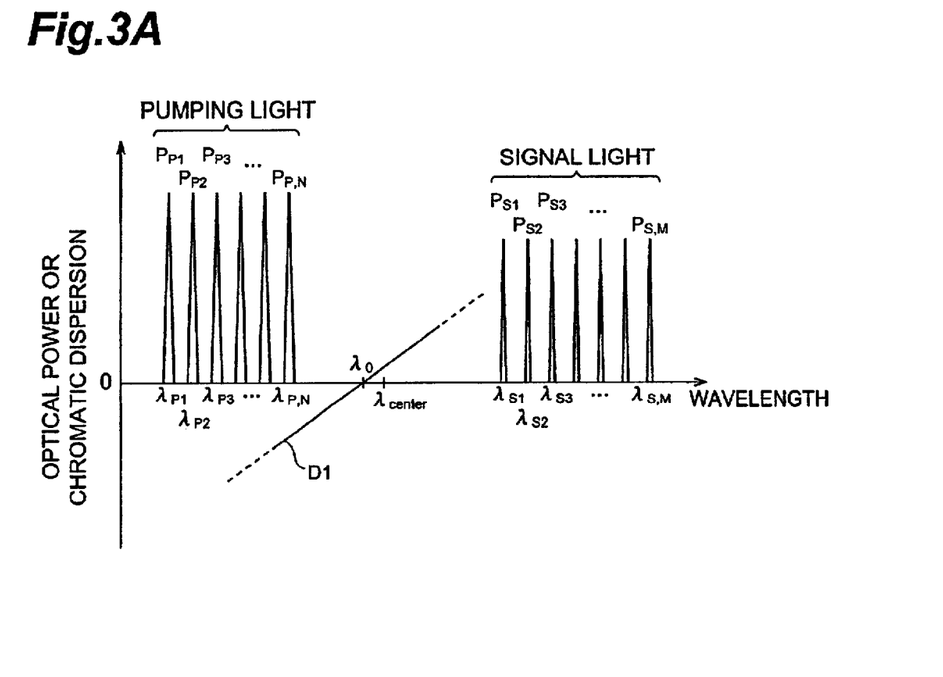
FIGS. 3A and 3B are charts showing chromatic dispersion characteristics of Raman amplification optical transmission lines in Raman amplifiers according to the present invention together with relationships with respect to signal light wavelength bands and pumping light wavelength bands.
Figure 3B:
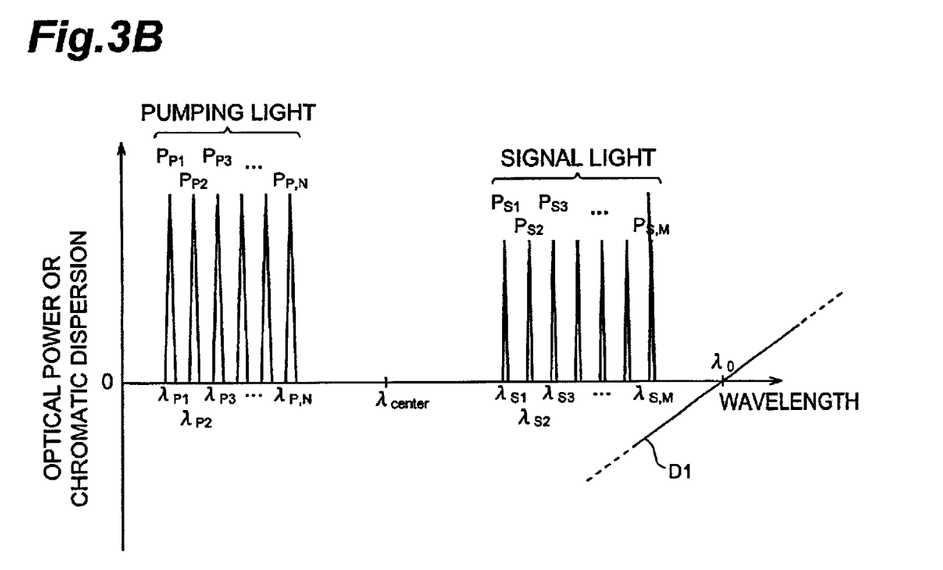

FIGS. 3A and 3B are charts showing chromatic dispersion characteristics of Raman amplification optical transmission lines in Raman amplifiers according to the present invention together with relationships with respect to signal light wavelength bands and pumping light wavelength bands. In each of the Raman amplifiers in the optical communication systems 1, 2 according to the first and second embodiments, the zero-dispersion wavelength of the Raman amplification optical waveguide (the optical fiber transmission line 20 in FIG. 1 or the Raman amplification optical fiber 43 in FIG. 2) is expressed by $\lambda_0$. As for the signal light of M channels (including M wavelength components) propagating through the Raman amplification optical waveguide, each wavelength component is expressed by $\lambda_{S,m}$ whereas each power is represented by $P_{S,m}$ ($1 \leq m \leq M$). As for the pumping light of N channels (including N wavelength components) propagating through the Raman amplification optical waveguide, each wavelength component is expressed by $\lambda_{P,n}$ whereas each power is represented by $P_{P,n}$ ($1 \leq n \leq N$). Curve D1 in FIG. 3A indicates the chromatic dispersion of an optical waveguide having a zero-dispersion wavelength on the shorter wavelength side than the signal light wavelength band, whereas curve D2 in FIG. 3B indicates the chromatic dispersion of an optical waveguide having a zero-dispersion wavelength on the longer wavelength side than the signal light wavelength band.

Here, the center-of-gravity wavelength $\lambda_{S,\,rms}$ of signal light, which is a mean weighted with respective powers of M wavelength components, is represented by the following expression (1A), whereas the sum $P_{S,\,total}$ of powers of the wavelength components included in the signal light is given by the following expression (1B):

$$\lambda_{S,\text{rms}} = \frac{\sum_{m=1}^{M}(\lambda_{S,m} \cdot P_{S,m})}{P_{S,total}} \quad (1A)$$

$$P_{S,total} = \sum_{m=1}^{M} P_{S,m} \quad (1B)$$

On the other hand, the center-of-gravity wavelength $\lambda_{P,\,rms}$ of pumping light, which is a mean weighted with respective powers of M wavelength components, is represented by the following expression (2A), whereas the sum $P_{P,\,total}$ of powers of the wavelength components included in the pumping light is given by the following expression (2B):

$$\lambda_{P,\text{rms}} = \frac{\sum_{n=1}^{N}(\lambda_{P,n} \cdot P_{P,n})}{P_{P,total}} \quad (2A)$$

$$P_{P,total} = \sum_{n=1}^{N} P_{P,n} \quad (2B)$$

The center wavelength $\lambda_{center}$ between the center-of-gravity wavelength $\lambda_{S,\,rms}$ of signal light and the center-of-gravity wavelength $\lambda_{P,\,rms}$ of pumping light is represented by the following expression (3):

$$\lambda_{center} = \frac{\lambda_{S,\text{rms}} + \lambda_{P,\text{rms}}}{2} \quad (3)$$

In the Raman amplifier according to the present invention, the zero-dispersion wavelength $\lambda_0$ of the Raman amplification optical waveguide is shifted from the center wavelength $\lambda_{center}$ by such a wavelength spacing that non-degenerate type four-wave mixing is effectively suppressed. Namely, the relationship represented by the following expression (4):

$$\lambda_0 \neq \lambda_{center} \quad (4)$$

holds between the zero-dispersion wavelength $\lambda_0$ of the Raman amplification optical waveguide and the center wavelength $\lambda_{center}$.

When the above-mentioned expression (4) is satisfied, the occurrence of non-degenerate type four-wave mixing, which is a kind of nonlinear optical phenomena, is suppressed in the Raman amplification optical waveguide, whereby an excellent transmission quality is realized (the deterioration of signal waveforms is suppressed).

In the Raman amplifier, the power of pumping light guided through the Raman amplification optical waveguide reaches several hundred mW to several W, whereby it is preferred that self-phase modulation and cross-phase modulation, which are other nonlinear optical phenomena, be further taken into consideration. When they are taken into consideration, a condition for suppressing the occurrence of non-degenerate type four-wave mixing is one under which the channel vector mismatching Δk defined by the following expression (5) satisfies the relationship given by the following expressions (6A) and (6B):

$$\Delta k = \frac{n_2\omega_2 + n_3\omega_3 - n_1\omega_1 - n_4\omega_4}{c} \quad (5)$$

$$\Delta k \neq -2\gamma P \quad (6A)$$

$$P = P_{S,total} + P_{P,total} \quad (6B)$$

where $\omega_1$, $\omega_2$ are optical angular frequencies of the pumping light, $\omega_3$ is the optical angular frequency of the signal light, $\omega_4$ is the optical angular frequency of a conjugate wave occurring due to non-degenerate type four-wave mixing, $n_i$ is the effective refractive index of the Raman amplification optical waveguide at an optical angular frequency $\omega_i$ ($1 \leq i \leq 4$), c is the light velocity in vacuum, and $\gamma$ is the nonlinear coefficient of the Raman amplification optical waveguide. For example, the value of nonlinear coefficient of a dispersion-compensating optical fiber is about 10 W$^{-1}$ km$^{-1}$. Though only four signal channels are taken into consideration in the above-mentioned expression (5), more conjugate waves exist in practice.

The channel vector is a function of wavelength, whereas the value obtained when inverting the polarity of the second derivative of channel vector with respect to wavelength can approximately be considered as chromatic dispersion. When the zero-dispersion wavelength $\lambda_0$ of the Raman amplification optical waveguide coincides with the center wavelength $\lambda_{center}$, the channel vector mismatching $\Delta k$ becomes zero. When the value of nonlinear coefficient $\gamma$ of the Raman amplification optical waveguide is small whereas the sum P of respective powers of the wavelength components included in the signal light and the wavelength components included in the pumping light is sufficiently low, the right side of the above-mentioned expression (6A) becomes zero, whereby this expression (6A) is equivalent to the above-mentioned expression (4).

When the value of nonlinear coefficient $\gamma$ of the Raman amplification optical waveguide is large, or the sum P of respective powers of the wavelength components included in the signal light and the wavelength components included in the pumping light is high, by contrast, the above-mentioned expression (4) is not appropriate. For suppressing the occurrence of non-degenerate type four-wave mixing in view of self-phase modulation and cross-phase modulation as well in such a case, it is preferred that the relationship given by the following expression (7):

$$\Delta k \geq 0 \quad (7)$$

be satisfied.

Figure 4:
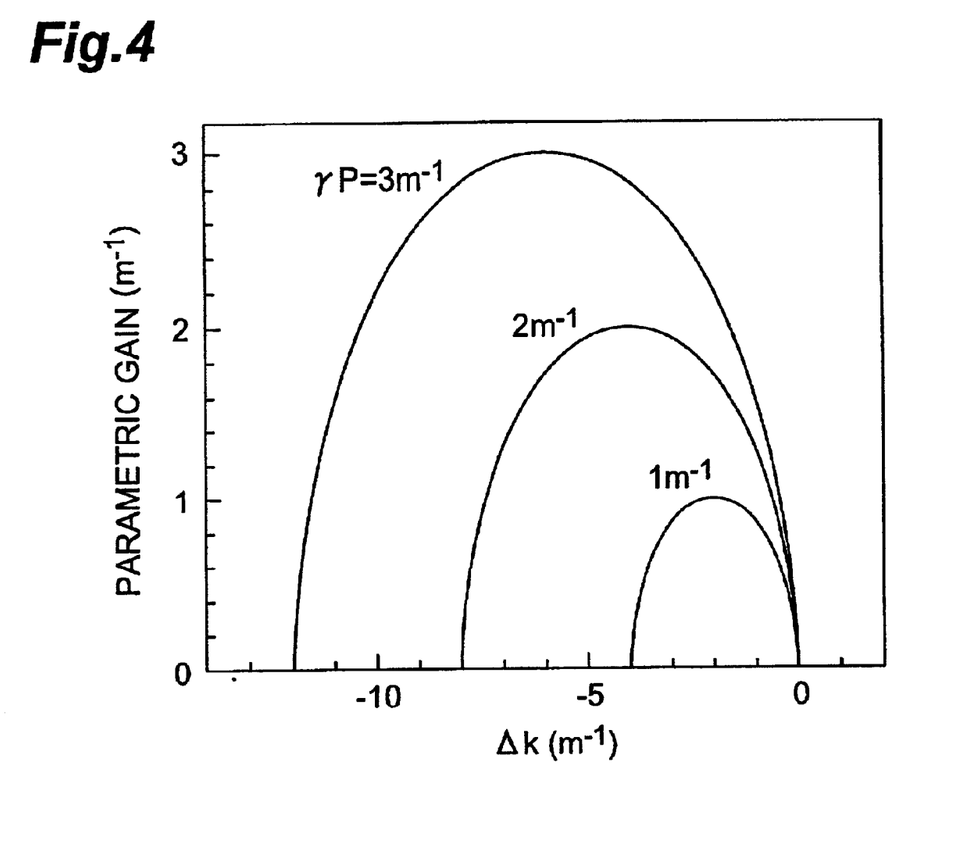
FIG. 4 is a graph showing relationships between parametric gain ($m^{-1}$) and channel vector mismatching $\Delta k$ ($m^{-1}$)

FIG. 4 is a graph showing relationships between parametric gain (m$^{-1}$), which is a cause of conjugate waves, and channel vector mismatching $\Delta k$ (m$^{-1}$). As can be seen from this graph, the occurrence of non-degenerate type four-wave mixing is effectively suppressed when the channel vector mismatching $\Delta k$ satisfies the above-mentioned expression (7).

For satisfying the above-mentioned expression (7), it will be sufficient if the zero-dispersion wavelength $\lambda_0$ of the Raman amplification optical waveguide is set to the shorter wavelength side than the center wavelength $\lambda_{center}$ when the Raman amplification optical waveguide has a positive dispersion slope d with respect to the signal light. Also, it will be sufficient if the zero-dispersion wavelength $\lambda_0$ of the Raman amplification optical waveguide is set to the longer wavelength side than the center wavelength $\lambda_{center}$ when the Raman amplification optical waveguide has a negative dispersion slope d with respect to the signal light. When a Raman amplification optical waveguide having such a dispersion slope d and zero-dispersion wavelength $\lambda_0$ is employed in the Raman amplifier according to the present invention, the occurrence of non-degenerate type four-wave mixing is effectively suppressed in view of self-phase modulation and cross-phase modulation as well, whereby an excellent transmission quality is obtained.

For suppressing the occurrence of non-degenerate type four-wave mixing in view of self-phase modulation and cross-phase modulation as well, it is necessary to satisfy the relationship given by the following expression (8):

$$\Delta k \leq -4\gamma P \quad (8)$$

This expression (8) can be considered equivalent to the above-mentioned expression (7) in that the amount of deviation from the value of the right side in the above-mentioned expression (6A) is the same. Therefore, the occurrence of non-degenerate type four-wave mixing will effectively be suppressed if the channel vector mismatching $\Delta k$ satisfies the above-mentioned expression (8). While there is a case where the zero-dispersion wavelength $\lambda_0$ satisfying the above-mentioned expression (7) is not always obtained depending on the design of the Raman amplification optical waveguide, e.g., optical fiber, it will be sufficient if the above-mentioned expression (8) is satisfied in such a case.

In general, when the wavelength difference is $\Delta\lambda$, the channel vector difference $\Delta k$ is approximated by the following expression (9):

$$\Delta k = \frac{\omega^2 d}{12\pi c} \Delta\lambda^3 \quad (9)$$

Therefore, for satisfying the above-mentioned expression (8) when the Raman amplification optical waveguide has a positive dispersion slope d with respect to the signal light, it will be sufficient if the zero-dispersion wavelength $\lambda_0$ of the Raman amplification optical waveguide is set to the longer wavelength side than the center wavelength $\lambda_{center}$ whereas the relationship given by the following expression (10)

$$\lambda_0 - \lambda_{center} \geq \left(\frac{48\pi c\gamma P}{\omega^2 d}\right)^{1/3} \quad (10)$$

is satisfied.

Here, if the zero-dispersion wavelength $\lambda_0$ exists within the signal light wavelength region, there is a high possibility of normal four-wave mixing occurring even when the occurrence of non-degenerate type four-wave mixing can be suppressed. Therefore, for suppressing the occurrence of normal four-wave mixing as well, it is preferred that the zero-dispersion wavelength $\lambda_0$ of the Raman amplification optical waveguide be set to the longer wavelength side than all the wavelength components included in the signal light as shown in FIG. 3B. When the Raman amplification optical waveguide has a negative dispersion slope d with respect to the signal light, by contrast, it will be sufficient if the zero-dispersion wavelength $\lambda_0$ of the Raman amplification optical waveguide is set to the shorter wavelength side than the center wavelength $\lambda_{center}$ whereas the relationship given by the following expression (11)

$$\lambda_0 - \lambda_{center} \leq \left(\frac{48\pi c\gamma P}{\omega^2 d}\right)^{1/3} \quad (11)$$

is satisfied.

An example of design of the Raman amplification optical waveguide and Raman amplifier satisfying the above-mentioned expression (10) will now be explained. In this design example, the sum of power of pumping light $P_{P, total}$, the center-of-gravity of pumping light $P_{P, rms}$, and the center-of-gravity of signal light $\lambda_{S, rms}$ are set to 28 dBm, 1.45 μm, and 1.55 μm, respectively. The Raman amplification optical waveguide is an optical fiber having the structure shown in FIGS. 5A and 5B.

Figure 5A:
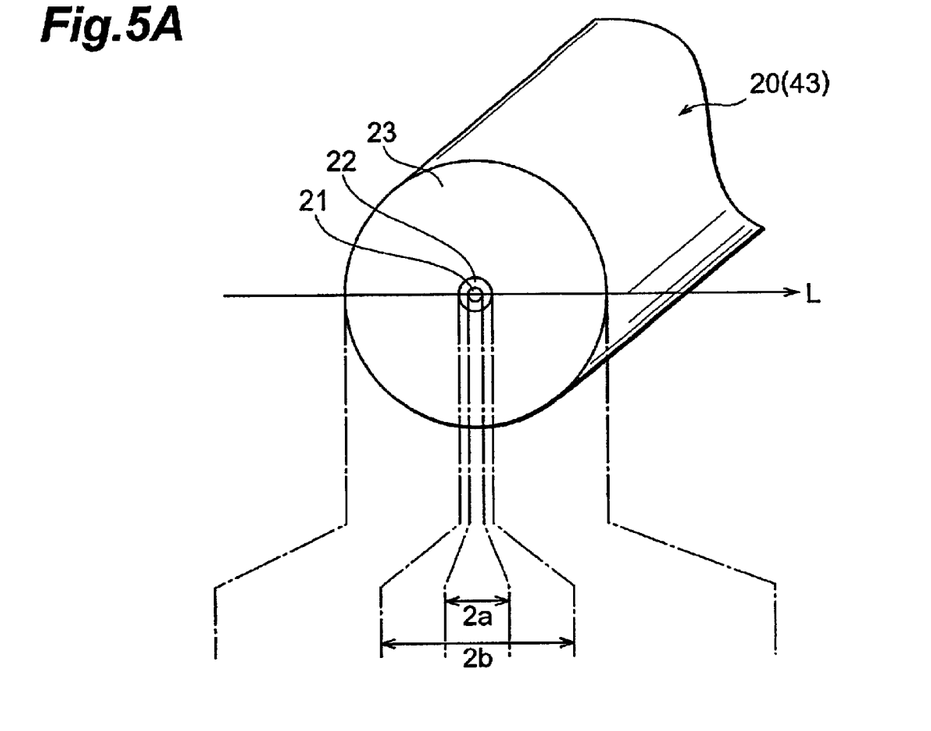

As shown in FIG. 5A, this Raman amplification optical fiber 20 comprises a core region 21 having a refractive index n1 with an outer diameter 2a; a depressed region 22 which is a glass region, disposed at the outer periphery of the core region 21, having a refractive index n2 (<n1) with an outer diameter 2b; and a cladding region 23 which is a glass region, disposed at the outer periphery of the depressed region 22, having a refractive index n3 (<n1, >n2). With reference to the refractive index n3 of the cladding region 23, the relative refractive index difference $\Delta^+(=((n1)^2-(n3)^2)/2\cdot(n3)^2)$ of the core region 21 is 3.3%, whereas the relative refractive index difference $\Delta^-(=((n2)^2-(n3)^2)/2\cdot(n3)^2)$ of the cladding region 22 is −0.4%.

Figure 5B:
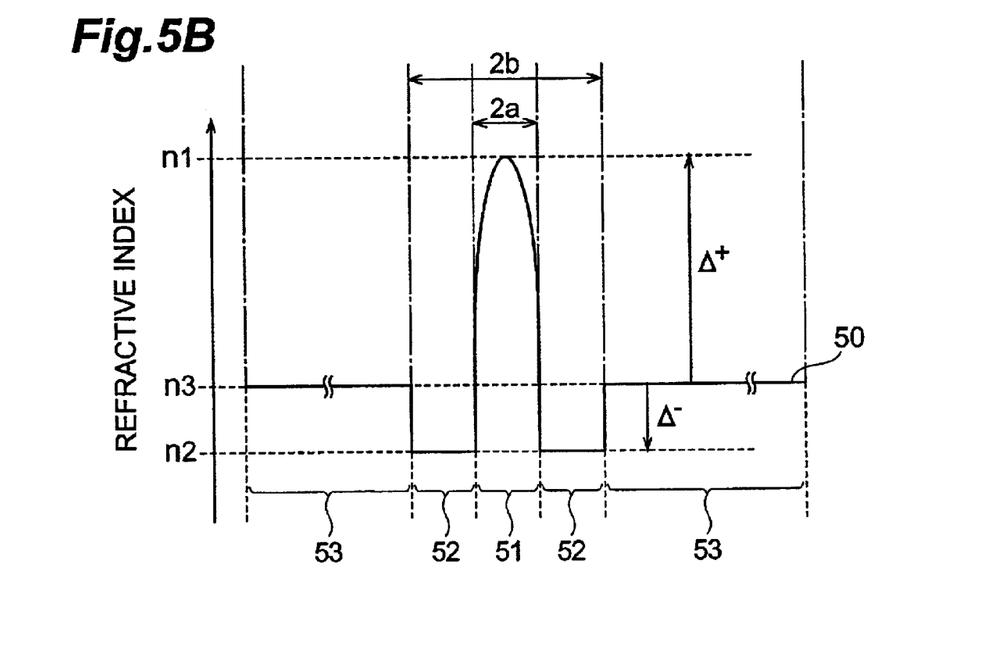
FIG. 5B is a refractive index profile of the Raman amplification optical waveguide shown in FIG. 5A.

FIG. 5B is the refractive index profile of the Raman amplification optical fiber 20 shown in FIG. 5A, illustrating the refractive index of each part on the line L orthogonal to the optical axis of the Raman amplification optical fiber 20. In this refractive index profile 50, areas 51, 52, and 53 show respective indices of individual parts on the line L of the core region 21, depressed region 22, and cladding region 23. In this specification, the relative refractive index difference Δ is expressed in terms of percentage, whereas refractive indices in each expression are in a fixed order.

The Raman amplification optical fiber 20 having the above-mentioned structure has a cutoff wavelength of 1.41 μm and, as characteristics at a wavelength of 1.55 μm, a mode-field diameter of 3.5 μm, a nonlinear coefficient γ of 21 W$^{-1}$ km$^{-1}$, and a dispersion slope d of +0.024 ps/nm$^2$/km. The zero-dispersion wavelength $\lambda_0$ of the Raman amplification optical fiber 20 is 1.68 μm. On the other hand, from the above-mentioned expression (10), the zero-dispersion wavelength $\lambda_0$ of the Raman amplification optical waveguide is required to be at least 1.52 μm in order to suppress the occurrence of non-degenerate type four-wave mixing. Hence, the Raman amplification optical fiber 20 and Raman amplifier satisfy the above-mentioned expression (10), so that the occurrence of non-degenerate type four-wave mixing is effectively suppressed in view of self-phase modulation and cross-phase modulation as well, whereby an excellent transmission quality is obtained.

Without being restricted to the above-mentioned embodiments, the present invention can be modified in various manners. For example, while counter-propagating pumping in which the pumping light is supplied in FIGS. 1 and 2 in a direction opposite from the signal light transmitting direction, it may be forward pumping in which the pumping light is supplied in the same direction as the signal light transmitting direction or bidirectional pumping.

According to the present invention, as explained in the foregoing, the zero-dispersion wavelength $\lambda_0$ of the Raman amplification optical waveguide is shifted from the center wavelength $\lambda_{center}$ $(=(\lambda_{S, rms}+\lambda_{P, rms})/2)$ existing between the center-of-gravity wavelength $\lambda_{S, rms}$ of the signal light and the center-of-gravity wavelength $\lambda_{P, rms}$ of the pumping light by a predetermined wavelength spacing, so that non-degenerate type four-wave mixing is effectively suppressed, whereby an excellent transmission quality is obtained with the deterioration of signal waveforms being suppressed. The zero-dispersion wavelength $\lambda_0$ is set to the shorter and longer wavelength sides than the center wavelength $\lambda_{center}$ when the optical waveguide has positive and negative dispersion slopes with respect to the signal light, respectively.

When the optical waveguide has a positive dispersion slope d with respect to the signal light in the Raman amplifier according to the present invention, the zero-dispersion wavelength $\lambda_0$ of the Raman amplification optical waveguide is set to a longer wavelength side than the above-mentioned center wavelength $\lambda_{center}$, and satisfies the following relationship:

$$\lambda_0 - \lambda_{center} \geq [48\pi \cdot c \cdot \gamma \cdot P/(\omega^2 \cdot d)]^{1/3}$$

where c is the light velocity in vacuum, γ is the nonlinear coefficient of the optical waveguide, P is the sum of respective powers of the signal light and pumping light, and ω is the optical angular frequency at the center wavelength $\lambda_{center}$.

When the optical waveguide has a negative dispersion slope d with respect to the signal light, the zero-dispersion wavelength $\lambda_0$ is set to a shorter wavelength side than the above-mentioned center wavelength $\lambda_{center}$, and satisfies the following relationship:

$$\lambda_0 - \lambda_{center} \leq [48\pi \cdot c \cdot \gamma \cdot P/(\omega^2 \cdot d)]^{1/3}$$

In these cases, the occurrence of non-degenerate type four-wave mixing is effectively suppressed in view of self-phase modulation and cross-phase modulation as well, whereby an excellent transmission quality is obtained. Also, the degree of freedom in designing the Raman amplification optical waveguide increases. When the optical waveguide has a positive dispersion slope d with respect to the signal light, the zero-dispersion wavelength $\lambda_0$ is preferably set to a longer wavelength side than all the wavelength components included in the signal light. In this case, the occurrence of normal four-wave mixing is effectively suppressed as well.

Since the optical communication system according to the present invention comprises a Raman amplifier having the above-mentioned structure, it similarly suppresses the occurrence of nonlinear optical phenomena, thereby yielding an excellent transmission quality.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A Raman amplifier for effectively suppressing the generation of non-degenerate type four-wave mixing, comprising:

an optical waveguide for propagating each of pumping light including a plurality of wavelength components in a first wavelength band and signal light including a plurality of wavelength components in a second wavelength band, and Raman-amplifying said signal light when said pumping light is supplied thereto; and a pumping light supplier optically connected to at least one end of said optical waveguide, said pumping light supplier supplying said pumping light to said optical waveguide;

wherein said optical waveguide has a zero-dispersion wavelength $\lambda_0$ shifted from a center wavelength $\lambda_{center} = (\lambda_{s,\,rms}+\lambda_{P,\,rms})/2$ existing between a center-of-gravity wavelength $\lambda_{s,\,rms}$ of said signal light obtained as a mean weighted with respective powers of said wavelength components included in said signal light and a center-of-gravity wavelength $\lambda_{P,\,rms}$ of said pumping light obtained as a mean weighted with respective powers of said wavelength components included in said pumping light by such a wavelength spacing that non-degenerate type four-wave mixing is effectively suppressed; and wherein said optical waveguide has a positive dispersion slope with respect to light in said second wavelength band, and said optical waveguide has a zero-dispersion wavelength $\lambda_0$ existing in a range without said first and second wavelength bands and being shorter than said center wavelength $\lambda_{center}$.

2. A Raman amplifier for effectively suppressing the generation of non-degenerative type four-wave mixing, comprising:

an optical waveguide for propagating each of pumping light including a plurality of wavelength components in a first wavelength band and signal light including a plurality of wavelength components in a second wavelength band, and Raman-amplifying said signal light when said pumping light is supplied thereto; and a pumping light supplier optically connected to at least one end of said optical waveguide, said pumping light supplier supplying said pumping light to said optical waveguide;

wherein said optical waveguide has a zero-dispersion wavelength $\lambda_0$ shifted from a center wavelength $\lambda_{center} = (\lambda_{s,\,rms}+\lambda_{P,\,rms})/2$ existing between a center-of-gravity wavelength $\lambda_{s,\,rms}$ of said signal light obtained as a mean weighted with respective powers of said wavelength components included in said signal light and a center-of-gravity wavelength $\lambda_{P,\,rms}$ of said pumping light obtained as a mean weighted with respective powers of said wavelength components included in said pumping light by such a wavelength spacing that non-degenerate type four-wave mixing is effectively suppressed; and wherein said optical waveguide has a negative dispersion slope with respect to light in said second wavelength band, and said optical waveguide has a zero-dispersion wavelength $\lambda_0$ existing within a range without said first and second wavelength bands and being longer than said center wavelength $\lambda_{center}$.

3. A Raman amplifier for effectively suppressing the generation of non-degenerative type four-wave mixing, comprising:

an optical waveguide for propagating each of pumping light including a plurality of wavelength components in a first wavelength band and signal light including a plurality of wavelength components in a second wavelength band, and Raman-amplifying said signal light when said pumping light is supplied thereto; and a pumping light supplier optically connected to at least one end of said optical waveguide, said pumping light supplier supplying said pumping light to said optical waveguide;

wherein said optical waveguide has a zero-dispersion wavelength $\lambda_0$ shifted from a center wavelength $\lambda_{center} = (\lambda_{s,\,rms}+\lambda_{P,\,rms})/2$ existing between a center-of-gravity wavelength $\lambda_{s,\,rms}$ of said signal light obtained as a mean weighted with respective powers of said wavelength components included in said signal light and a center-of-gravity wavelength $\lambda_{P,\,rms}$ of said pumping light obtained as a mean weighted with respective powers of said wavelength components included in said pumping light by such a wavelength spacing that non-degenerate type four-wave mixing is effectively suppressed;

wherein said optical waveguide has a positive dispersion slope with respect to light in said second wavelength band;

wherein said optical waveguide has a zero-dispersion wavelength $\lambda_0$ longer than said center wavelength $\lambda_{center}$; and wherein said Raman amplifier satisfies the following relationship:

$$\lambda_0 - \lambda_{center} \geq (48\pi \cdot c \cdot \gamma \cdot P/(\omega^2 \cdot d))^{1/3}$$

where c is the light velocity in vacuum, $\gamma$ is the nonlinear coefficient of said optical waveguide, P is the sum of respective powers of all the wavelength components included in said signal light and all the wavelength components included in said pumping light, and $\omega$ is the optical angular frequency at said center wavelength $\lambda_{center}$, and d is the dispersion slope of said optical waveguide.

4. A Raman amplifier according to claim 3, wherein said optical waveguide has a zero-dispersion wavelength $\lambda_0$ longer than all the wavelength components included in said signal light.

5. A Raman amplifier for effectively suppressing the generation of non-degenerate type four-wave mixing, comprising:

an optical waveguide for propagating each of pumping light including a plurality of wavelength components in a first wavelength band and signal light including a plurality of wavelength components in a second wavelength band, and Raman-amplifying said signal light when said pumping light is supplied thereto; and a pumping light supplier optically connected to at least one end of said optical waveguide; said pumping light supplier supplying said pumping light to said optical waveguide;

wherein said optical waveguide has a zero-dispersion wavelength $\lambda_0$ shifted from a center wavelength $\lambda_{center} = (\lambda_{s,\,rms}+\lambda_{P,\,rms})/2$ existing between a center-of-gravity wavelength $\lambda_{s,\,rms}$ of said signal light obtained as a mean weighted with respective powers of said wavelength components included in said signal light and a center-of-gravity wavelength $\lambda_{P,\,rms}$ of said pumping light obtained as a mean weighted with respective powers of said wavelength components included in said pumping light by such a wavelength spacing that non-degenerate type four-wave mixing is effectively suppressed;

wherein said optical waveguide has a negative dispersion slope with respect to light in said second wavelength band;

wherein said optical waveguide has a zero-dispersion wavelength $\lambda_0$ shorter than said center wavelength $\lambda_{center}$; and wherein said Raman amplifier satisfies the following relationship:

$$\lambda_0 - \lambda_{center} \leq (48\pi \cdot c \cdot \gamma \cdot P/(\omega^2 \cdot d))^{1/3}$$

where c is the light velocity in vacuum, $\gamma$ is the nonlinear coefficient of said optical waveguide, P is the sum of respective powers of all the wavelength components included in said signal light and all the wavelength components included in said pumping light, $\omega$ is the optical angular frequency at said center wavelength $\lambda_{center}$, and d is the dispersion slope of said optical waveguide.

6. An optical communication system including a Raman amplifier according to claim 1, wherein said optical waveguide of said Raman amplifier includes an optical fiber transmission line laid in a repeating section of said optical communication system.

7. An optical communication system comprising:

an optical fiber transmission line, laid in a repeating section, for propagating signal light including a plurality of wavelength components; and a Raman amplifier according to claim 1, said Raman amplifier disposed within a repeater.

8. An optical communication system including a Raman amplifier according to claim 2, wherein said optical waveguide of said Raman amplifier includes an optical fiber transmission line laid in a repeating section of said optical communication system.

9. An optical communication system comprising:

an optical fiber transmission line, laid in a repeating section, for propagating signal light including a plurality of wavelength components; and a Raman amplifier according to claim 2, said Raman amplifier disposed within a repeater.

10. An optical communication system including a Raman amplifier according to claim 3, wherein said optical waveguide of said Raman amplifier includes an optical fiber transmission line laid in a repeating section of said optical communication system.

11. An optical communication system comprising:

an optical fiber transmission line, laid in a repeating section, for propagating signal light including a plurality of wavelength components; and a Raman amplifier according to claim 3, said Raman amplifier disposed within a repeater.

12. An optical communication system including a Raman amplifier according to claim 5, wherein said optical waveguide of said Raman amplifier includes an optical fiber transmission line laid in a repeating section of said optical communication system.

13. An optical communication system comprising:

an optical fiber transmission line, laid in a repeating section, for propagating signal light including a plurality of wavelength components; and a Raman amplifier according to claim 5, said Raman amplifier disposed within a repeater.

* * * * *